United States Patent Office 3,419,592
Patented Dec. 31, 1968

3,419,592
METHOD FOR MAKING ORGANOSILOXANE
HYDRIDES
Abe Berger, Schenectady, N.Y., assignor to General
Electric Company, a corporation of New York
No Drawing. Filed Dec. 21, 1964, Ser. No. 420,144
2 Claims. (Cl. 260—448.2)

ABSTRACT OF THE DISCLOSURE

A method is provided for making organosiloxane hydrides by reducing halogen atoms attached to silicon of a halogen-substituted organopolysiloxane. Selective reduction of the halogen atoms of the halogen-substituted organopolysiloxane is achieved with a trialkylboron catalyst utilized in combination with a sufficient amount of an alkali metal hydride.

The present invention relates to a method for partially reducing halosiloxanes. More particularly, the present invention relates to a method of making organosiloxanes having hydrogen attached to silicon.

It is generally known that organosiloxane having chemically combined units of the formula, (1) $\quad H(R)(R')_a SiO_{\frac{(2-a)}{2}}$ where R is selected from a monovalent hydrocarbon radical and halogenated monovalent hydrocarbon radical, R' is selected from hydrogen, halogen radicals and R radicals, and $a$ is a whole number equal to 0 or 1, can be employed to make valuable curable organopolysiloxane compositions. Cure of such organopolysiloxane compositions comprising such organosiloxane having hydrogen attached to silicon, and organosilicon material having olefinically unsaturated organic radicals attached to silicon can be effected with a platinum catalyst.

Present methods for making organosiloxane having units of Formula 1 involve the hydrolysis of silanes having hydrogen and hydrolyzable radicals attached to silicon, such as shown by the formula, (2) $\quad H(R)(R')_a SiX_{2-a}$ where R, R' and $a$ are as defined above, and X is a halogen radical. Some of the silanes of Formula 2 for example, dimethylchlorosilane, can be obtained from the halosilane crude produced by reacting silicon powder and organic halides in the presence of copper catalyst. However, the variety of organohalosilicon hydrides produced by such method is limited and the quantity provided is unpredictable. As taught by Eaborn, Organosilicon Compounds, Butterworth Scientific Publications, London (1960) on p. 195, partial reduction of organohalogenosilane is not possible. Some of the direct methods for making silanes of Formula 2, involve the employment of Grignard reagents or the direct halogenation of organosilicon hydrides with mercury salts. Again, these methods are unsatisfactory because they require the use of expensive reagents.

The present invention is based on the discovery, that organosiloxane having units of Formula 1, can be made by the partial reduction of halosiloxane of the formula, (3) $\quad (X)_b(R)_c SiO_{\frac{(4-b-c)}{2}}$ where R and X are as defined above, $b$ has a value equal to 0.2 to 1, inclusive, $c$ has a value equal to 1 to 2.5, inclusive, and the sum of $b$ and $c$ is equal to 1.2 to 3, inclusive. The partial reduction of the halosiloxane of Formula 3 can be achieved with a mixture of an effective amount of an alkylboron compound of the formula, (4) $\quad (R'')_d BX_{3-d}$ and an alkali metal hydride, such as sodium hydride, where R'' is an alkyl radical, X is defined above, and $d$ is an integer equal to 1 to 3, inclusive. This result is quite surprising because prior art attempts to partially reduce halosiloxane without effecting siloxane cleavage have been unsuccessful. For example, as taught by Schuman and Robertson, J. Am. Chem. Soc. 77, 5294 (1955), hexachlorodisiloxane was converted completely to silane, when an attempt was made to reduce it to the corresponding disilylether with lithium aluminum hydride.

As utilized hereinafter, the term "alkali metal hydride" includes sodium hydride, potassium hydride, lithium hydride, rubidium hydride, cesium hydride, and mixtures thereof. Preferably, sodium hydride is employed in the practice of the invention.

Radicals included by R of the above formulae are aryl radicals, such as phenyl, tolyl, naphthyl; haloaryl radicals, such as chlorophenyl, chloronaphthyl, etc.; aralkyl radicals such as phenylethyl, benzyl, etc.; aliphatic, haloaliphatic and cycloaliphatic such as alkenyl and alkyl radicals, for example, methyl, ethyl, propyl, trifluorobutyl, pentyl, octyl, etc.; alkenyl radicals such as vinyl, propenyl; cycloalkyl radicals such as cyclohexyl, cyclohexenyl. Where R can represent more than one radical, these radicals can be all the same or any two or more of the aforementioned R radicals.

There is provided by the present invention, a method for making organosiloxane having hydrogen radicals attached to silicon referred to hereinafter as "organosiloxane hydride," which comprises (A) agitating a mixture comprising a halosiloxane of Formula 3 and an alkali metal hydride in the presence of an effective amount of an alkyl boron compound of Formula 4, and (B) recovering organosiloxane hydride from (1), where said alkali metal hydride is utilized in said mixture at an amount sufficient to provide for up to about one atom of hydrogen of said alkali metal hydride, per halogen atom attached to silicon in said mixture.

Among the preferred organosiloxane hydride that can be made in accordance with the practice of the invention, are arylsiloxane hydride having the formula, (5) $\quad (H)_e(R'')_f(R''')_g(X)_h SiO_{\frac{(4-e-f-g-h)}{2}}$ where X and R'' are defined above, R''' is selected from aryl radicals and halogenated aryl radicals, $e$ has a value equal to 0.2 to 1, $f$ can be 0, and can have a value equal to from 0.2 to 1, inclusive, $g$ has a value equal to 1 or 2, and $h$ can be 0, and can have a value equal to 0.2 to 0.8, inclusive.

For example, there are included by the preferred organosiloxane hydride of Formula 5, organosilicon material consisting essentially of siloxy units such as $(H)(C_6H_5)SiO$,

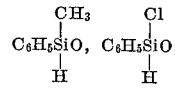

chemically combined with units such as $(C_6H_5)_2SiO$, $(CH_3)C_6H_5SiO$, etc.

Methods for making alkyl halosiloxane, included by Formula 3, are shown by Patnode Patent 2,381,366 and Sauer Patent 2,421,653, both assigned to the same assignee as the present invention. A method for making arylhalosiloxane included by Formula 3 is shown by Burkhardt, J. Am. Chem. Soc. 67, 2173 (1945).

Alkylboron compounds included by Formula 4 are for example, alkyl boron such as triethyl boron, tributyl boron, trimethyl boron, etc., and alkylboron halides such as dimethylboron chloride, diethylboron chloride.

In the practice of the invention, a mixture of the trialkyl boron, alkali metal hydride, and the halosiloxane is agitated. The organosiloxanehydride is then recovered from the resulting reaction mixture.

The order of addition of the various reactants to form the reaction mixture is not critical. For example one procedure that can be employed is to add the halosiloxane to a mixture of the trialkyl boron and the alkali metal hydride. It has been found expedient to utilize an organic solvent in combination with the reactants to facilitate the agitation of the various ingredients in the formation of the organosiloxane hydride. Suitable organic solvents include for example, benzene, toluene, mineral oil, tetrahydrofuran, hexane, diglyme, etc.

A temperature between 0° C. to 150° C. can be employed, and preferably a temperature between 60° C. to 90 C. Reaction times can last as little as ½ hour or less to as long as 8 hours or more depending upon the reactants utilized, degree of agitation, temperature, etc.

The amount of alkali metal hydride required to achieve desirable results will depend upon such factors as the moles of halogen attached to silicon in the reaction mixture, the degree to which the halosiloxane is to be reduced, etc. For example, in particular situations, partial reduction of the halosiloxane may be desired. One instance is the partial reduction of 1,3-dichlorotetraphenyldisiloxane to chlorotetraphenyldisiloxane. It has been found that effective results can be achieved if at least sufficient alkali metal hydride is utilized to provide for at least 0.2 mole of hydrogen per mole of halosiloxane in the reaction mixture. In this instance where complete reduction is desired, experience has shown that no more alkali metal hydride should be utilized in the mixture than that sufficient to provide for moles of hydrogen equal to the moles of halogen radicals attached to silicon in the reaction mixture. More specifically, it has been found that no more hydrogen atoms of the alkali metal hydride should be utilized for complete reduction than the halogen atoms attached to silicon in the mixture. In order to avoid using excess alkali metal hydride, it has been found expedient to utilize a sufficient excess of halosiloxane to provide for an excess of halogen radicals attached to silicon over the hydrogen atoms of the alkali metal hydride in the reaction mixture.

The amount of trialkylboron that is utilized in the reaction mixture is not critical, since it serves as a catalyst and does not enter into the reaction. However, effective results can be achieved if at least about 0.25 part to about 1.5 parts of the trialkylboron per part of the halosiloxane is employed. Smaller amounts of the trialkylboron can be employed if extended reaction times can be tolerated while larger amounts may in some instances promote the reaction rate.

At the completion of the reaction, the reaction mixture can be filtered of insolubles such as salts. The solvent can be stripped and the resulting organosiloxane hydride can be received by distillation, etc.

In order that those skilled in the art will be better able to practice the invention, the following examples are given by way of illustration and not by way of limitation. All parts are by weight.

Example 1

A solution of 1,3-dichlorotetraphenyldisiloxane in hexane was added to a mixture of triethylboron and lithium hydride in hexane under a nitrogen atmosphere while the mixture was vigorously agitated. There was utilized an amount of 1,3-dichlorotetraphenyl which was equal to the moles of lithium hydride in the mixture. The resulting mixture also contained about 4 parts of hexane, and 0.25 part of triethylboron per part of the 1,3-dichlorotetraphenyldisiloxane. The mixture was refluxed for 8 hours. It was stripped of solvent and the product was distilled at a pressure of 0.4 millimeter to a temperature of 210° C. There was also obtained about a 30% yield of 1-chlorotetraphenyldisiloxane.

Example 2

There were added 5 parts of triethylboron to a solution of 4.6 parts of a 50% suspension of sodium hydride in mineral oil, in 50 parts of hexane. The resulting mixture was heated to reflux. There was then added to the resulting mixture, an amount of 1,3-dichlorotetraphenyldisiloxane in hexane equal to the moles of sodium hydride while the resulting mixture was rapidly agitated. External heat was then removed due to the exothermic reaction and the reflux rate was controlled by the rate of addition. After about ½ hour, the addition was complete. The mixture was then refluxed for an additional hour. It was then filtered and distilled. There was obtained a 65% yield of tetraphenyldisiloxane. Its identity was confirmed by its infrared spectrum.

Example 3

The procedure of Example 2 was repeated except that in place of the 1,3-dichlorotetraphenyldisiloxane, there was added to a mixture of 9.6 parts sodium hydride and 5 parts of triethylboron in hexane, and an amount of bis (methylphenylchlorosilyl)ether equal to the moles of sodium hydride. The mixture was rapidly stirred under a nitrogen atmosphere during the addition. As soon as the exothermic reaction had subsided, external heat was applied and the mixture was refluxed for an additional hour after the addition had been completed. A product was obtained by filtering the resulting mixture and fractionating it. There was obtained an 83% yield of 1,3-dimethyl-1,3-diphenyldisiloxane. Its identity was confirmed by its infrared spectrum.

Example 4

There is added 5 parts of triethylboron to an equimolar mixture of sodium hydride and a chlorine terminated polydiphenylsiloxane having an average of about 7 chemically combined diphenylsiloxy units. The triethylboron is utilized in the mixture at about 5% by weight of the chlorine-terminated polydiphenylsiloxane. The mixture is then refluxed for about 4 to 5 hours. The mixture is then filtered and stripped of solvent. The resulting product is examined. Its infrared spectrum shows the presence of phenylsiloxane and silicon hydride.

Example 5

The procedure of Example 2 was repeated, except that there was utilized only about ½ mole of sodium hydride per mole of the 1,3-dichlorotetraphenyldisiloxane. After the addition was completed, the mixture was refluxed for an additional hour. The mixture was then filtered and distilled in accordance with the previously described procedure. There was obtained a substantial yield of 1-chlorotetraphenyldisiloxane as well as unreacted starting 1,3-dichlorotetraphenyldisiloxane. The identity of the product was confirmed by its vapor phase chromatography as well as infrared spectrum.

Example 6

There are added under a nitrogen atmosphere, 10.2 parts of tetramethyl-1,3-dichlorodisiloxane to a mixture of 50 parts of hexane, 4.6 parts of a 50% suspension in mineral oil of sodium hydride and 5 parts of triethylboron. After the addition is completed, the mixture is allowed to cool. It is filtered of salt and distilled. A product is obtained boiling at a temperature between 74° C.–76° C. There is obtained about a 50% yield of tetramethyldisiloxane. Its identity is confirmed by its infrared spectrum.

While the foregoing examples have of necessity been limited to only a few of the very many variables with respect to the method employed in the practice of the present invention, it should be understood that the present invention is directed to a method of preparing a much broader class of siloxane hydrides containing chemically combined units of Formula 1. These polymers can be made by reacting halosiloxane shown by Formula 3 and an alkali metal hydride in the presence of a trialkylboron of Formula 4.

What I claim as new and desire to secure by Letters Patent of the United States is:

1. A method which comprises,
   (1) effecting reaction at a temperature between 60° C. and 90° C. between (A) an alkali metal hydride and (B) 1,3-dichlorotetraphenyldisiloxane in the presence of (C) a small but effective amount, and up to 1.5 parts per part of (B) of triethylboron and,
   (2) recovering 1,1,3,3-tetraphenyldisiloxane from the resulting mixture of (1), where (A) is utilized in an amount sufficient to provide for up to one hydrogen atom of (A) per halogen atom attached to silicon of (B).

2. A method which comprises (1) effecting reaction at a temperature between 60° C. and 90° C. between (A) an alkali metal hydride and (B) 1,1,1-methylphenylchloro-3,3,3-methylphenylchlorodisiloxane in the presence of (C) a small effective amount, and up to 1.5 parts per part of (B) of triethylboron and, (2) recovering 1,1-methylphenyl-3,3-methylphenyldisiloxane from the resulting mixture of (1) where (A) is utilized in an amount sufficient to provide for up to one hydrogen atom of (A) per halogen atom attached to silicon of (B).

References Cited

UNITED STATES PATENTS

| | | | |
|---|---|---|---|
| 2,572,302 | 10/1951 | Barry | 260—448.2 |
| 2,660,597 | 11/1953 | Shafer | 260—448.2 |
| 3,043,857 | 7/1962 | Jenkner | 260—448.2 |

FOREIGN PATENTS

| | | |
|---|---|---|
| 596,259 | 4/1960 | Canada. |

PAUL F. SHAVER, *Assistant Examiner.*